United States Patent
Pan et al.

(10) Patent No.: US 8,941,952 B1
(45) Date of Patent: Jan. 27, 2015

(54) DISK DRIVE HEAD STACK ASSEMBLY HAVING A FLEXIBLE PRINTED CIRCUIT WITH BOND PADS HAVING REDUCED CAPACITANCE

(71) Applicant: Western Digital Technologies, Inc., Irvine, CA (US)

(72) Inventors: Tzong-Shii Pan, San Jose, CA (US); Cliff Zhang, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/300,415

(22) Filed: Jun. 10, 2014

(51) Int. Cl.
*G11B 5/48* (2006.01)

(52) U.S. Cl.
USPC ...................................................... 360/244.1

(58) Field of Classification Search
USPC ...................................................... 360/244.1
See application file for complete search history.

(56) References Cited

U.S. PATENT DOCUMENTS

| | | | |
|---|---|---|---|
| 5,235,482 | A | 8/1993 | Schmitz |
| 6,046,889 | A | 4/2000 | Berding et al. |
| 6,052,890 | A | 4/2000 | Malagrino, Jr. et al. |
| 6,061,206 | A | 5/2000 | Foisy et al. |
| 6,101,876 | A | 8/2000 | Brooks et al. |
| 6,147,831 | A | 11/2000 | Kennedy et al. |
| 6,151,189 | A | 11/2000 | Brooks |
| 6,151,197 | A | 11/2000 | Larson et al. |
| 6,185,067 | B1 | 2/2001 | Chamberlain |
| 6,185,074 | B1 | 2/2001 | Wang et al. |
| 6,208,486 | B1 | 3/2001 | Gustafson et al. |
| 6,215,616 | B1 | 4/2001 | Phan et al. |
| 6,288,866 | B1 | 9/2001 | Butler et al. |
| 6,292,333 | B1 | 9/2001 | Blumentritt et al. |
| 6,344,950 | B1 | 2/2002 | Watson et al. |
| 6,349,464 | B1 | 2/2002 | Codilian et al. |
| 6,388,873 | B1 | 5/2002 | Brooks et al. |
| 6,417,979 | B1 | 7/2002 | Patton, III et al. |
| 6,421,208 | B1 | 7/2002 | Oveyssi |
| 6,441,998 | B1 | 8/2002 | Abrahamson |
| 6,462,914 | B1 | 10/2002 | Oveyssi et al. |
| 6,466,398 | B1 | 10/2002 | Butler et al. |
| 6,469,871 | B1 | 10/2002 | Wang |
| 6,502,300 | B1 | 1/2003 | Casey et al. |
| 6,519,116 | B1 | 2/2003 | Lin et al. |
| 6,529,345 | B1 | 3/2003 | Butler et al. |
| 6,529,351 | B1 | 3/2003 | Oveyssi et al. |
| 6,535,358 | B1 | 3/2003 | Hauert et al. |
| 6,545,382 | B1 | 4/2003 | Bennett |
| 6,549,381 | B1 | 4/2003 | Watson |
| 6,560,065 | B1 | 5/2003 | Yang et al. |

(Continued)

FOREIGN PATENT DOCUMENTS

CN 200910138059 7/2013

*Primary Examiner* — Mark Blouin

(57) ABSTRACT

A head stack assembly (HSA) for a disk drive includes an actuator body, at least one actuator arm extending from the actuator body, and a flexible printed circuit (FPC). The FPC may include a FPC conductive layer having a plurality of FPC traces that terminate at respective ones of a plurality of electrically conductive FPC bond pads. The FPC may include a metallic FPC stiffener layer having a surface that underlies and faces the FPC bond pads. The FPC stiffener layer surface may include a plurality of recessions having a depth of at least 25 microns. A FPC dielectric layer may be disposed between the FPC conductive layer and the metallic FPC stiffener layer. One or more of the plurality of FPC bond pads may be internally patterned to define a FPC bond pad mesh with a plurality of openings therethrough.

20 Claims, 7 Drawing Sheets

(56) References Cited

U.S. PATENT DOCUMENTS

| | | | |
|---|---|---|---|
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,673,256 B2 * | 1/2004 | Takasugi ................... 216/22 |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,714,383 B2 * | 3/2004 | Kado et al. ................. 360/244.1 |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |

(56) References Cited

U.S. PATENT DOCUMENTS

| | | |
|---|---|---|
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,004,798 B1 | 8/2011 | Dunn |
| 8,009,384 B1 | 8/2011 | Little |
| 8,018,687 B1 | 9/2011 | Little et al. |
| 8,031,431 B1 | 10/2011 | Berding et al. |
| 8,040,635 B2 * | 10/2011 | Miura et al. ............... 360/244.3 |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,254,064 B2 * | 8/2012 | Kikuchi ..................... 360/245.9 |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,289,656 B1 | 10/2012 | Huber |
| 8,295,014 B1 | 10/2012 | Teo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,462,464 B1 | 6/2013 | Dunn |
| 8,462,466 B2 | 6/2013 | Huber |
| 8,467,151 B1 | 6/2013 | Huber |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,364 B1 | 10/2013 | Schreiber et al. |
| 8,553,366 B1 | 10/2013 | Hanke |
| 8,553,367 B1 | 10/2013 | Foisy et al. |
| 8,605,390 B2 * | 12/2013 | Kikuchi et al. ............ 360/264.2 |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

* cited by examiner

DISK DRIVE HEAD STACK ASSEMBLY HAVING A FLEXIBLE PRINTED CIRCUIT WITH BOND PADS HAVING REDUCED CAPACITANCE

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. All heads that can read may be referred to as read heads herein, even if the head is also capable of other functions (e.g. writing) and/or includes other structures, such as a heater, laser, microactutor, lapping guide, etc.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flexible printed circuit (FPC). The plurality of HGAs are attached to various arms of the actuator.

Modern laminated flexures typically include flexure conductive traces that are isolated from a flexure structural layer by a flexure dielectric layer. So that the signals from/to the head can reach the FPC on the actuator body, each HGA flexure includes a flexure tail that extends away from the head along a corresponding actuator arm and ultimately attaches to the FPC adjacent the actuator body. That is, the flexure includes flexure traces that extend from adjacent the head and continue along the flexure tail to a flexure tail terminal region that includes electrically conductive flexure bond pads adjacent the FPC.

The FPC includes electrically conductive FPC bond pads that correspond to the flexure bond pads of the flexure tail, and FPC conductive traces that lead from the FPC bond pads to a pre-amplifier chip. The FPC conductive traces are typically separated from a FPC stiffener by a FPC dielectric layer. The FPC may also include a FPC cover layer over the FPC conductive traces, the FPC cover layer having a window to allow electrical conduction to the pre-amplifier chip and access to the FPC bond pads. To facilitate electrical connection of the flexure bond pads to the FPC bond pads during the HSA manufacturing process, the flexure tails must first be properly aligned relative to the FPC. Then the flexure tails must be held or constrained against the FPC conductive electrical terminals while the aforementioned electrical connections are made (e.g. by ultrasonic bonding, solder jet bonding, solder bump reflow, or an anisotropic conductive film).

However, an undesirable electrical impedance discontinuity may exist at the location of where the flexure bond pads are electrically connected to the FPC bond pads. Such electrical impedance discontinuity may degrade the performance of the electrical trace connections to the read head. For example, the electrical impedance discontinuity may undesirably limit signal bandwidth and thereby limit maximum data transfer rate. Often it is not practical to attempt to reduce the impedance discontinuity by reducing the size of the flexure bond pads or the FPC bond pads in the design, because sufficient bond pad area is required during the bonding process to accommodate bond pad alignment uncertainty.

Accordingly, there is a need in the art for an improved FPC design that may reduce an electrical impedance discontinuity at the location of where the flexure bond pads are electrically connected to the FPC bond pads.

DESCRIPTION OF THE PREFERRED EMBODIMENTS

Figure 1:
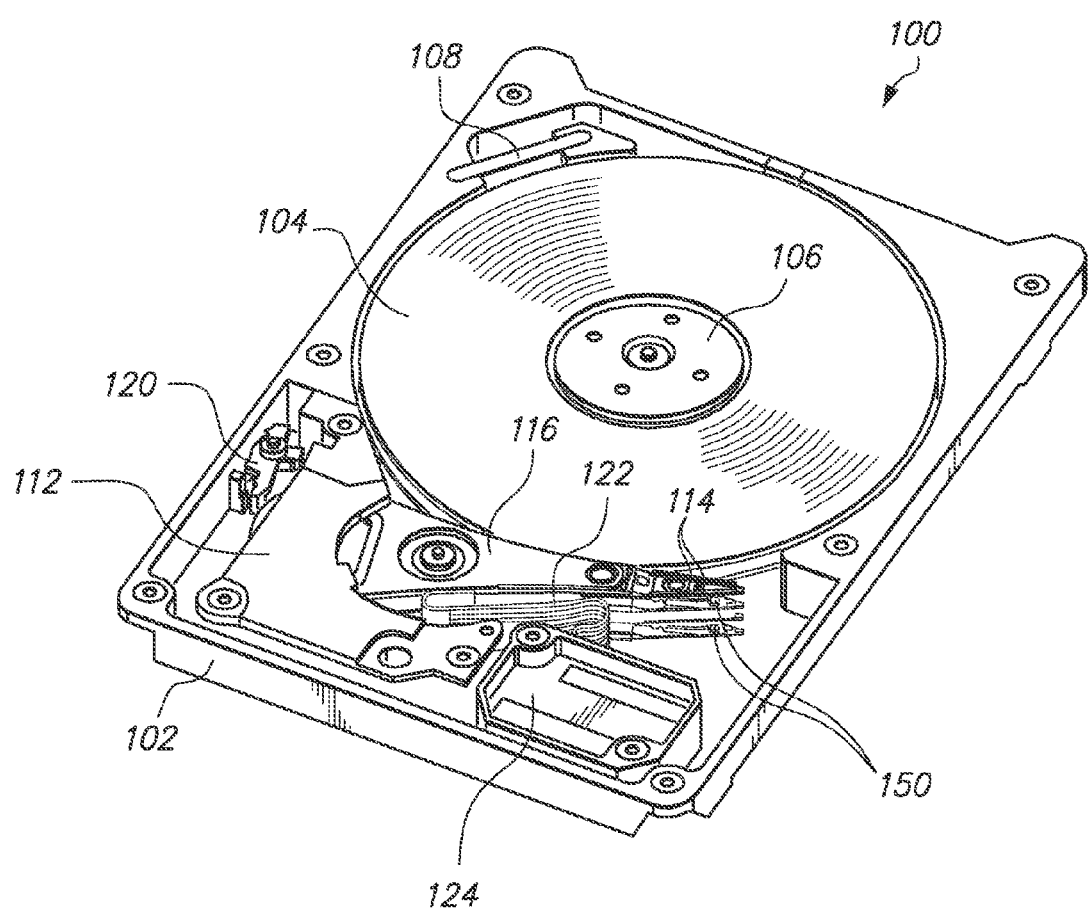
FIG. 1 is top perspective view of a disk drive capable of including an embodiment of the present invention.

FIG. 1 is a top perspective view of a disk drive 100 capable of including an embodiment of the present invention. The disk drive 100 includes a disk drive base 102 and two annular magnetic disks 104. The disk drive 100 further includes a spindle 106, rotatably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes a head stack assembly (HSA) 116 that is rotatably mounted on disk drive base 102. Voice coil motor 112 rotates the HSA 116 through a limited angular range so that at least one head gimbal assembly (HGA) 114 is desirably positioned relative to one or more tracks of information on a corresponding one of the disks 104. In the embodiment of FIG. 1, the HSA 116 includes three actuator arms upon which four HGAs 114 are attached, each corresponding to a surface of one of the two disks 104. However in other embodiments fewer or more HGAs 114 may be included depending on the number of disks 104 that are included and whether the disk drive 100 is depopulated. Each HGA 114 includes a head 150 for reading and writing data from and to one of the disks 104. The HSA 116 may occasionally be latched at an extreme angular position within the limited angular range, by latch 120. Electrical signals to/from the HGAs 114 are carried to other drive electronics via a flexible printed circuit (FPC) that includes a flex cable 122 (preferably including a preamplifier circuit) and flex cable bracket 124, the FPC being part of the HSA 116.

Figure 2:
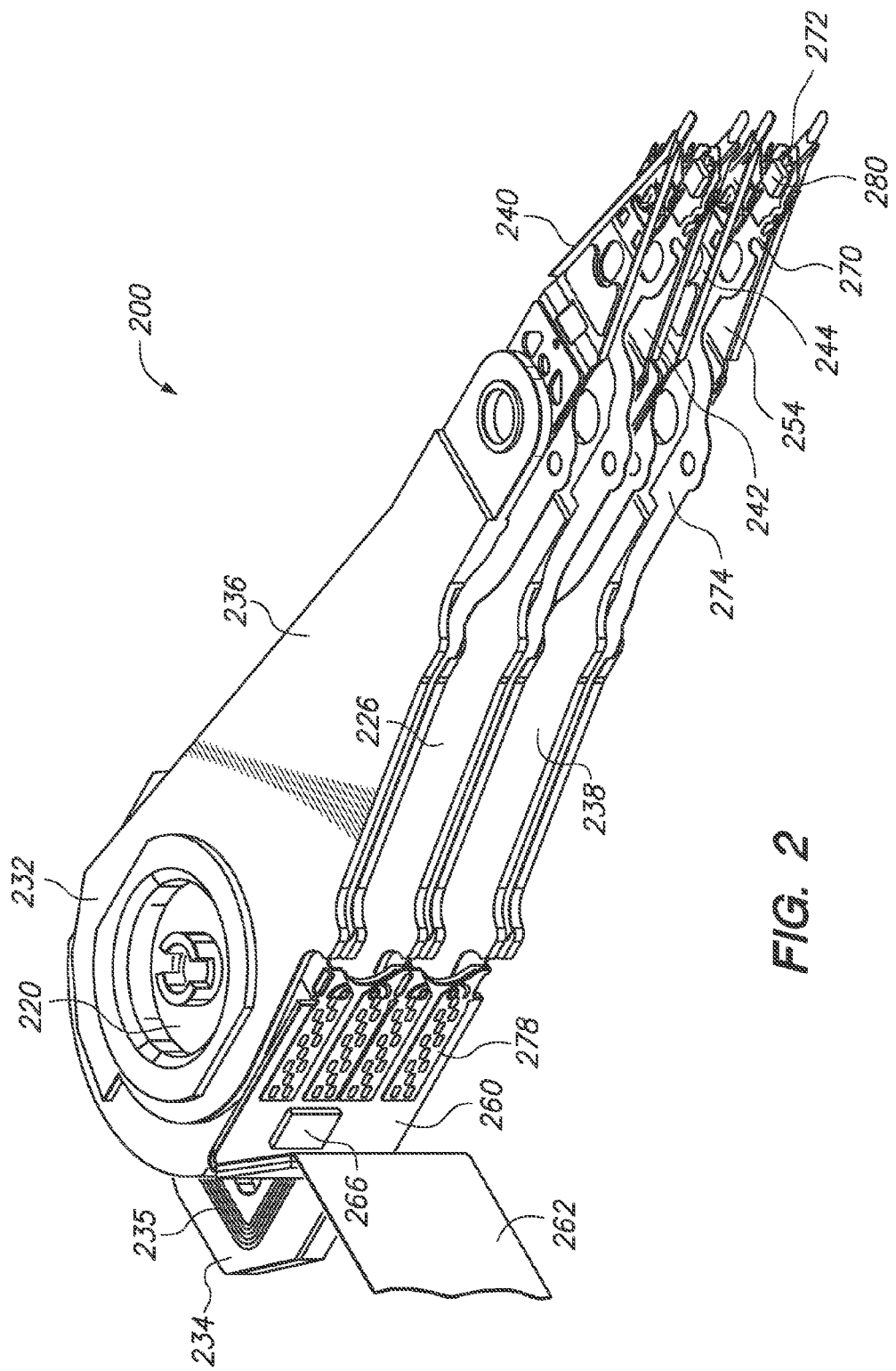
FIG. 2 is a perspective view of a head stack assembly (HSA) capable of including an embodiment of the present invention.

FIG. 2 is a perspective view of a head stack assembly (HSA) 200 capable of including an embodiment of the present invention. The HSA 200 includes an actuator body 232 and a plurality of actuator arms 226, 236, 238 extending from the actuator body 232. The actuator body 232 includes a pivot bearing cartridge 220 disposed in the actuator bore, and a coil support 234 that supports a coil 235 and extends from the actuator body 232 in a direction that is generally opposite the actuator arms 226, 236, 238. The HSA 200 also includes a plurality of head gimbal assemblies (HGA) 240, 242, 244, 254, attached to the actuator arms 226, 236, 238. For example, such attachment may be made by swaging. Note that the inner actuator arm 226 includes two HGAs, while each of the outer actuator arms 236, 238, includes only one HGA. This is because in a fully populated disk drive the inner arms are positioned between disk surfaces while the outer actuator arms are positioned over (or under) a single disk surface. In a depopulated disk drive, however, any of the actuator arms may have one or zero HGAs, possibly replaced by a dummy mass.

In the embodiment of FIG. 2, each HGA 240, 242, 244, 254, includes a head for reading and/or writing to an adjacent disk surface (e.g. HGA 254 includes head 280). The head 280 is attached to a tongue portion 272 of a laminated flexure 270. The laminated flexure 270 is part of the HGA 254, and is attached to a load beam (the part of the HGA 254 to which the numerical label 254 points). The laminated flexure 270 may include a structural layer (e.g. stainless steel), a dielectric layer (e.g. polyimide), and a conductive layer into which traces are patterned (e.g. copper).

In the embodiment of FIG. 2, the HSA 200 also includes a flexible printed circuit (FPC) 260 adjacent the actuator body 232. The FPC 260 includes a flex cable 262 and a preamplifier 266. The FPC 260 may comprise a laminate that includes two or more conventional dielectric and conductive layer materials (e.g. one or more polymeric materials, copper, etc). The laminated flexure 270 includes a flexure tail 274 that runs along the actuator arm 238 to a terminal region 278 of the laminated flexure 270 that is electrically connected to FPC bond pads of the FPC 260.

Methods of electrical connection of the flexure tails to the FPC 260 include ultrasonic bonding of gold coatings thereon, solder reflow, solder ball jet (SBJ), and anisotropic conductive film (ACF) bonding, and are preferably but not necessarily automated. To electrically connect and securely attach the flexure tails to the FPC 260, the flexure tails are first aligned with the FPC 260, and then pressed against the FPC 260 (at least temporarily) while electrical connection is established and secure attachment is completed. Maintaining sufficient uniform pressure and temperature to groups of bond pads may be desirable during this process, especially if an anisotropic conductive film is used to make the desired electrical connections.

An anisotropic conductive film is typically an adhesive doped with conductive beads or cylindrical particles of uniform or similar diameter. As the doped adhesive is compressed and cured, it is heated and squeezed between the surfaces to be bonded with sufficient uniform pressure that a single layer of the conductive beads makes contact with both surfaces to be bonded. In this way, the thickness of the adhesive layer between the bonded surfaces becomes approximately equal to the size of the conductive beads. The cured adhesive film may conduct electricity via the contacting beads in a direction normal to the bonded surfaces (though may not necessarily conduct electricity parallel to the bonded surfaces, since the beads may not touch each other laterally—though axially each bead is forced to contact both of the surfaces to be bonded—hence the term "anisotropic").

Figure 3A:
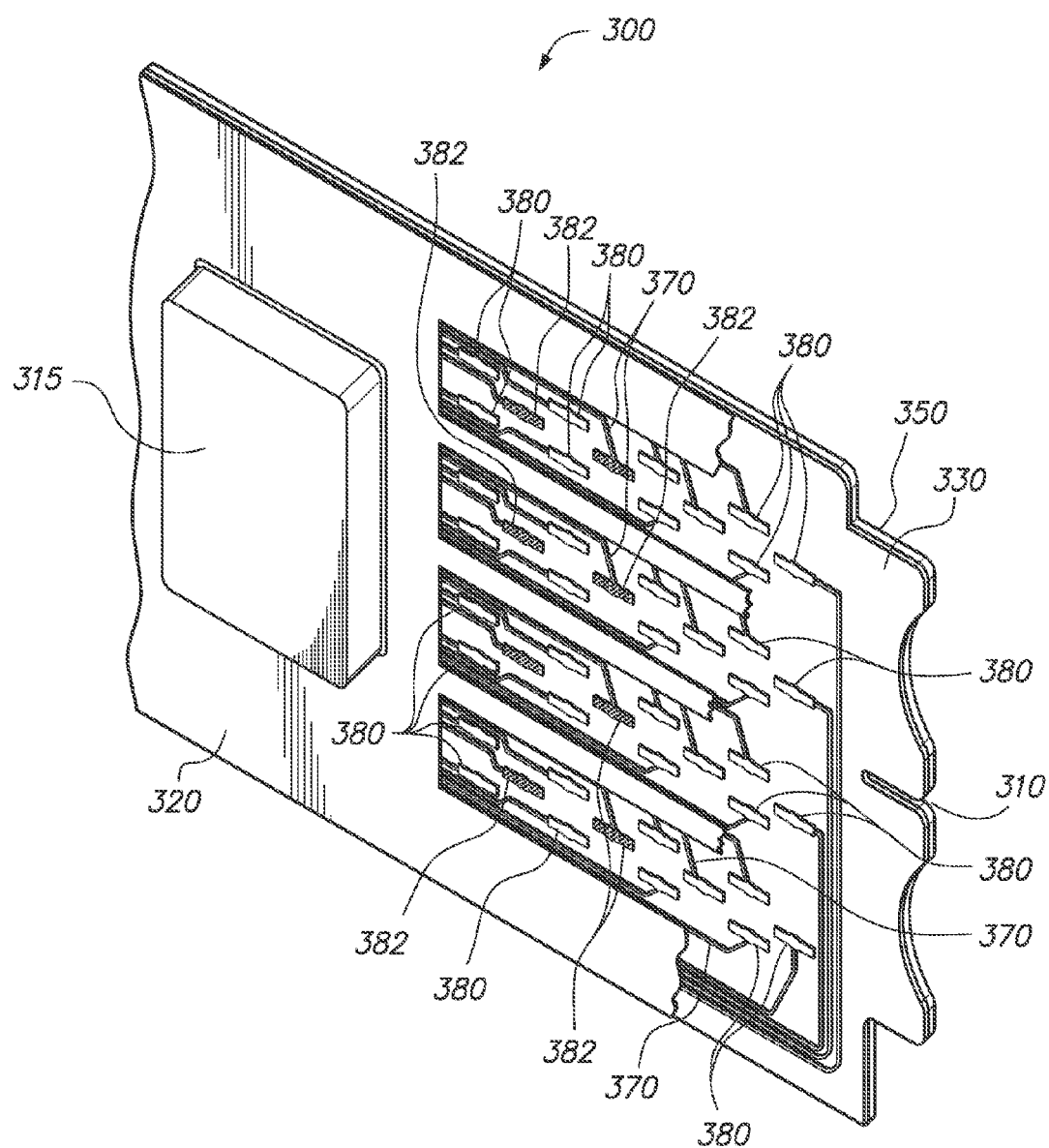
FIG. 3A is a perspective view of a portion of a flexible printed circuit (FPC) according to an embodiment of the present invention, shown with a FPC cover layer partially cut-away.

FIG. 3A is a perspective view of a portion of a flexible printed circuit (FPC) 300 according to an embodiment of the present invention. In the embodiment of FIG. 3A, the FPC 300 includes a plurality of electrically conductive FPC traces 370 disposed on a FPC dielectric layer 330. Each of the plurality of FPC traces has a distal portion that terminates at a respective one of a plurality of electrically conductive FPC bond pads 380, 382. The electrically conductive FPC traces 370 may comprise copper for example, and the FPC bond pads 380, 382 may comprise copper with a gold coating, for example. The electrically conductive FPC bond pads 380, 382 are intended to be aligned with and connected to flexure bond pads of the terminal regions of HGA flexure tails (e.g. flexure tail terminal region 278 shown in FIG. 2). The electrically conductive FPC traces 370 may connect to a pre-amplifier chip 315.

The FPC 300 is depicted in FIG. 3A in a state before flexure tail terminal regions (i.e. the portion of each flexure tail that overlaps the FPC, for example, flexure tail terminal region 278 of FIG. 2) are bonded thereto, so that the FPC bond pads 380, 382 are exposed and so can be viewed. Two of the HGA flexure tails may pass through a FPC slit 310 to help facilitate their support and alignment.

The FPC 300 may include an optional insulative cover layer 320, having windows exposing the regions where the flexure tail terminal regions and the pre-amplifier chip 315 are bonded thereto. The cover layer 320 is shown partially cut away in the view of FIG. 3A, so that the electrical conduits 370 can be better depicted. In an alternative embodiment, the FPC 300 may have an upper conductive layer that includes the FPC bond pads 380, 382 with the electrical conduits 370 pertaining to a lower conductive layer that is separated from the upper conductive layer by a dielectric layer (e.g. with the FPC bond pads 380, 382 being connected to the electrical conduits 370 through vias in such an intermediate dielectric layer). Such an alternative embodiment would have no need for an insulative cover layer like the cover layer 320.

The FPC 300 may include a FPC stiffener layer 350 that may be metallic. For example, the FPC stiffener layer 350 may comprise aluminum. The FPC stiffener layer 350 may be disposed in contact with the actuator body after assembly (e.g. in contact with the actuator body 232 that is shown in FIG. 2). Now referring again to FIG. 3A, the FPC dielectric layer 330 is preferably disposed between the FPC stiffener layer 350 and the FPC traces 370, for example to prevent the FPC stiffener 350 from creating an electrical short between the FPC traces 370 if the FPC stiffener layer 350 comprises a conductive metal. Note that the FPC dielectric layer 330 is not the same layer as the insulative FPC cover layer 320, at least because the insulative FPC cover layer 320 is disposed over the FPC traces 370 rather than between the FPC stiffener 350 and the FPC traces 370.

Figure 3B:
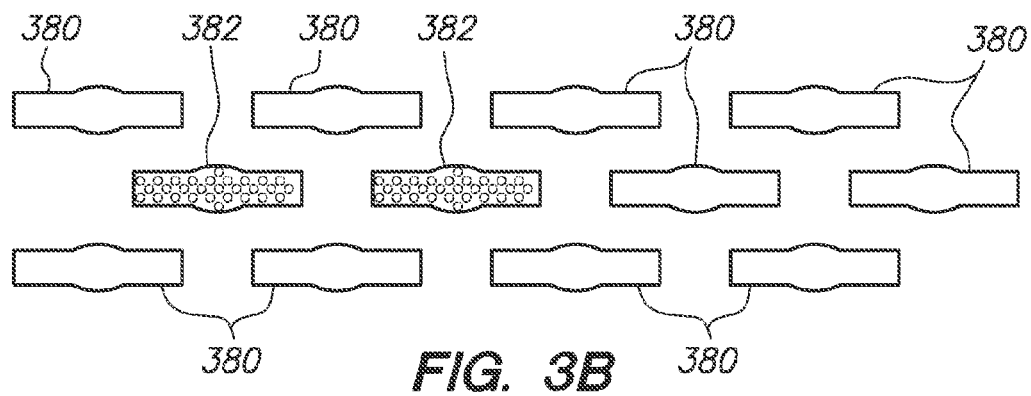
FIG. 3B depicts a plurality of FPC bond pads according to an embodiment of the present invention.

FIG. 3B depicts the plurality of FPC bond pads 380, 382 more clearly. In the embodiment of FIGS. 3A and 3B, the FPC bond pads 382 are internally patterned to define a FPC bond pad mesh with a plurality of round openings therethrough, while the FPC bond pads 380 are not. It is contemplated that more or different FPC bond pads could be internally patterned, rather than or in addition to the two FPC bond pads 382 shown in the plurality of FIG. 3B. For example, in certain embodiments, any or all of the FPC bond pads might be internally patterned to define a FPC mesh having a plurality of openings therethrough.

In the embodiment of FIGS. 3A and 3B, the internal patterning of the FPC bond pads 382 (so that each of the FPC bond pads 382 include a plurality of openings therethrough), functions as a means for reducing the electrical capacitance between the FPC bond pads 382 and the metallic FPC stiffener layer 350, by reducing an effective total surface area of the FPC bond pads 382. For example, in certain embodiments, a combined area of the plurality of openings through the FPC bond pad mesh of each FPC bond pad 382 may comprises between 25% and 75% of a total area of that FPC bond pad 382. Capacitive edge effects may cause the capacitance reduction percentage to fall short of the bond pad area reduction percentage, but in many embodiments the resulting capacitance reduction may be advantageously substantial.

Figure 4:
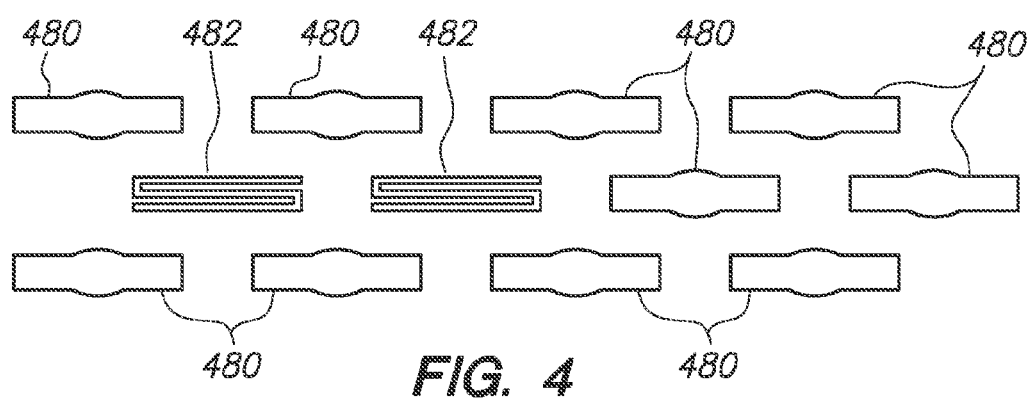
FIG. 4 depicts a plurality of FPC bond pads according to another embodiment of the present invention.

FIG. 4 depicts a plurality of FPC bond pads 480, 482 according to another embodiment of the present invention. In the embodiment of FIG. 4, the FPC bond pads 482 are internally patterned to define a FPC bond pad mesh with a plurality of slotted openings therethrough, while the FPC bond pads 480 are not. It is contemplated that more or different FPC bond pads could be internally patterned, rather than or in addition to the two FPC bond pads 482 shown in the plurality of FIG. 4. Note that in the embodiment of FIG. 4, the plurality of slotted openings (through the FPC bond pads 482) have an open periphery, so that the FPC bond pads 482 have a serpentine shape in the plan view.

The internal patterning of the FPC bond pads 482 (so that each of the FPC bond pads 482 include a plurality of slotted openings therethrough), functions as a means for reducing the electrical capacitance between the FPC bond pads 482 and the metallic FPC stiffener layer, by effectively reducing an effective total surface area of the FPC bond pads 482. For example, in certain embodiments, a combined area of the plurality of slotted openings through the FPC bond pad mesh of each FPC bond pad 482 may comprise between 25% and 75% of a total area of that FPC bond pad 482. Capacitive edge effects may cause the capacitance reduction percentage to fall short of the bond pad area reduction percentage, but in many embodiments the capacitance reduction may be advantageously substantial.

Figure 5:
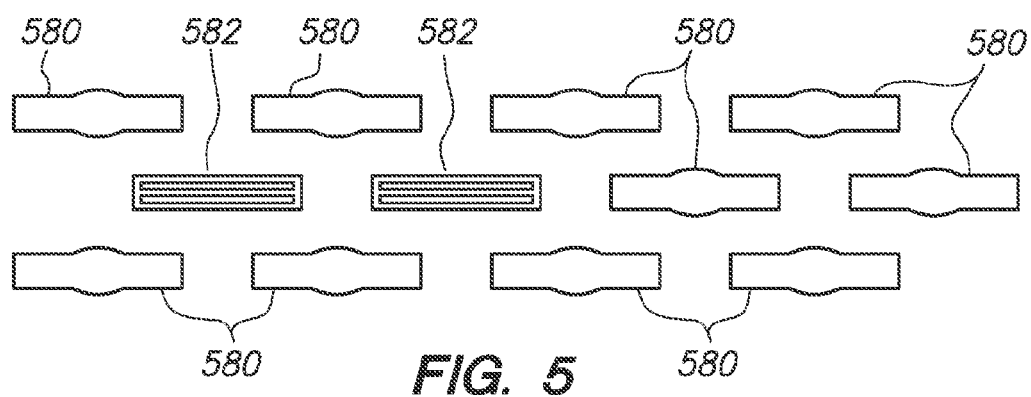
FIG. 5 depicts a plurality of FPC bond pads according to another embodiment of the present invention.

FIG. 5 depicts a plurality of FPC bond pads 580, 582 according to another embodiment of the present invention. In the embodiment of FIG. 5, the FPC bond pads 582 are internally patterned to define a FPC bond pad mesh with a plurality of rectangular openings therethrough, while the FPC bond pads 580 are not. It is contemplated that more or different FPC bond pads could be internally patterned, rather than or in addition to the two FPC bond pads 582 shown in the plurality of FIG. 5. Note that in the embodiment of FIG. 5, the plurality of rectangular openings (through the FPC bond pads 582) have a closed periphery, so that the FPC bond pads 582 have a grill shape in the plan view.

The internal patterning of the FPC bond pads 582 (so that each of the FPC bond pads 582 include a plurality of rectangular openings therethrough), functions as a means for reducing the electrical capacitance between the FPC bond pads 582 and the metallic FPC stiffener layer, by effectively reducing an effective total surface area of the FPC bond pads 582. For example, in certain embodiments, a combined area of the plurality of rectangular openings through the FPC bond pad mesh of each FPC bond pad 582 may comprise between 25% and 75% of a total area of that FPC bond pad 582. Capacitive edge effects may cause the capacitance reduction percentage to fall short of the bond pad area reduction percentage, but in many embodiments the capacitance reduction may be advantageously substantial.

Figure 6A:
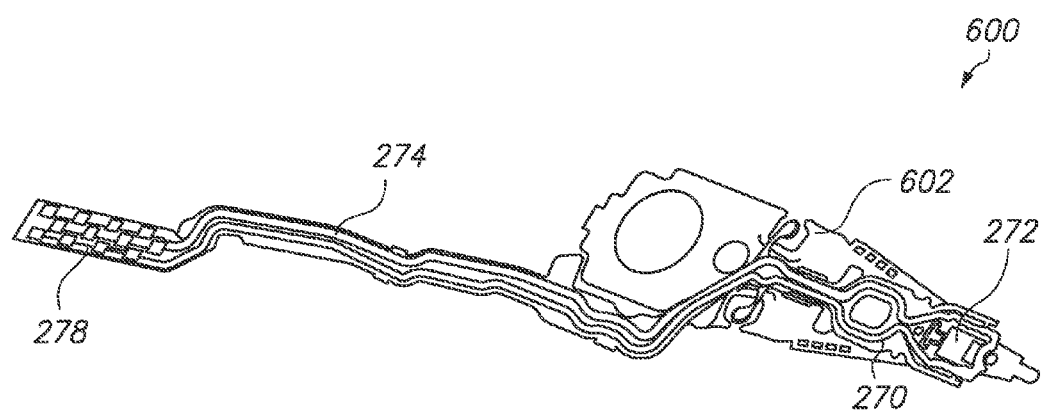
FIG. 6A is a perspective view of an HGA capable of use with an embodiment of the present invention.

FIG. 6A is a perspective view of a suspension assembly 600 capable of use with an embodiment of the present invention. Now referring to FIGS. 1, 2, and 6A, the suspension assembly 600 may be used in the HGA 254 to support the head 280 after it is assembled into the HGA 254. However, before assembly into the HGA 254, the suspension assembly 600 does not include a head, and suspension assemblies may be manufactured and sold without including a head. The suspension assembly 600 includes a load beam 602. A purpose of the load beam 602, once the suspension assembly 600 is included in the HGA 254, is to provide vertical compliance for the head 280 to follow vertical undulations of the surface of a disk (e.g. disk 104 of FIG. 1) as it rotates, and to preload the head 280 against the surface of the disk 104 as it rotates, by a preload force that is commonly referred to as the "gram load."

In the embodiment of FIG. 6A, the suspension assembly 600 also includes a laminated flexure 270 attached to the load beam 602. For example, a structural layer (e.g. stainless steel layer) of the laminated flexure 270 may be spot welded to the load beam 602. Still referring to FIGS. 1, 2, and 6A, when the suspension assembly 600 is included in a HGA (e.g. HGA 254), the head 280 is attached to a head mounting surface of a tongue 272 of the laminated flexure 270. A first purpose of the laminated flexure 270 is to provide compliance for the head 280 to follow pitch and roll angular undulations of the surface of disk 104 as it rotates, while restricting motion of the head 280 in the lateral direction and about a yaw axis. A second purpose of the laminated flexure 270 is to provide a plurality of electrical paths to the head 280 to facilitate signal transmission to/from the head 280.

For that second purpose, the laminated flexure 270 may include a plurality of electrically conductive traces. Specifically, the laminated flexure 270 may include a flexure structural layer (e.g. stainless steel), a flexure dielectric layer (e.g. polyimide), and a flexure conductive layer (e.g. copper) in which flexure conductive traces are defined. Still referring to FIGS. 1, 2, and 6A, so that the signals from/to the head 280 can reach the FPC 260, the laminated flexure 270 may include a flexure tail 274 that extends away from the tongue 272 along the actuator arm 238 of the HSA 200 and ultimately connects to the FPC 260 adjacent the actuator body 232. That is, the laminated flexure 270 may include conductive traces that extend from adjacent the head 280 and terminate at flexure bond pads at a terminal region 278 of the flexure tail 274.

As seen from FIGS. 1, 2, and 6A, the flexure tail 274 is a distinct and smaller component, as compared with FPC 260 or its flex cable 262. Methods of electrical connection of the flexure tail terminal region 278 to the FPC 260 include ultrasonic tab bonding, solder reflow, anisotropic conductive film (ACF) bonding, or solder jet bond (SJB).

Figure 6B:
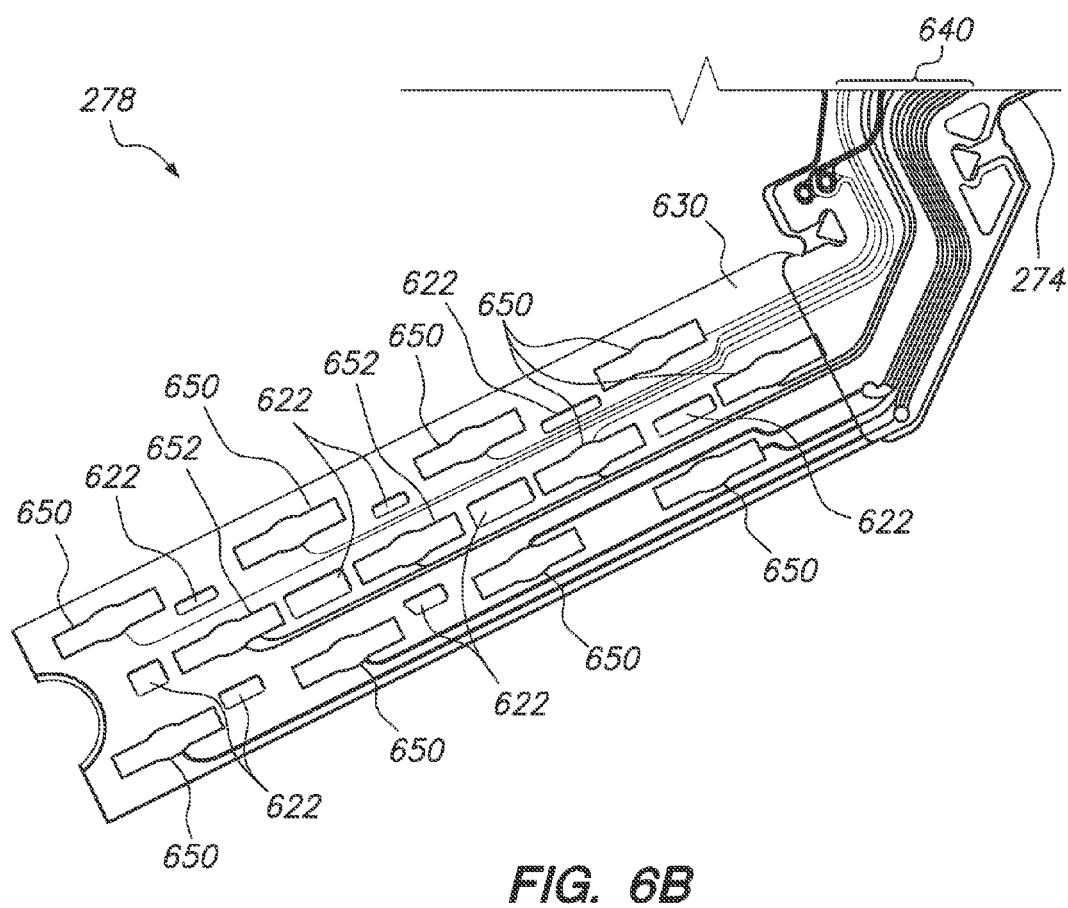
FIG. 6B is a plan view of a flexure tail terminal region, capable of use with an embodiment of the present invention.

FIG. 6B is a plan view of a terminal region 278 of a laminated flexure tail 274 according to an embodiment of the present invention. The laminated flexure tail 274 includes conductive traces 640 that are defined by patterning in a conductive (e.g. copper) layer of the laminated flexure tail 274.

In the embodiment of FIG. 6B, the flexure tail terminal region 278 includes a plurality of flexure bond pads 650, 652 (e.g. comprising gold) that are configured to be aligned with and connected to corresponding ones of a plurality of FPC bond pads (e.g. FPC bond pads 380, 382 of FIG. 3A). For example, the flexure bond pads 650 may be aligned with and bonded to the FPC bond pads 380, and the flexure bond pads 652 may be aligned with and bonded to FPC bond pads 382.

In the embodiment of FIG. 6B, a dielectric layer 630 of the flexure tail terminal region 278 may also optionally include a plurality of through openings 622, for example to control the spread of ACF material used to make electrical connections to the flexure bond pads 650, 652. During the bonding process a thermode tool may be brought into contact with the flexure tail terminal region 278, to press the flexure bond pads 650, 652 against the FPC bond pads 380, 382 for a period.

Figure 7:
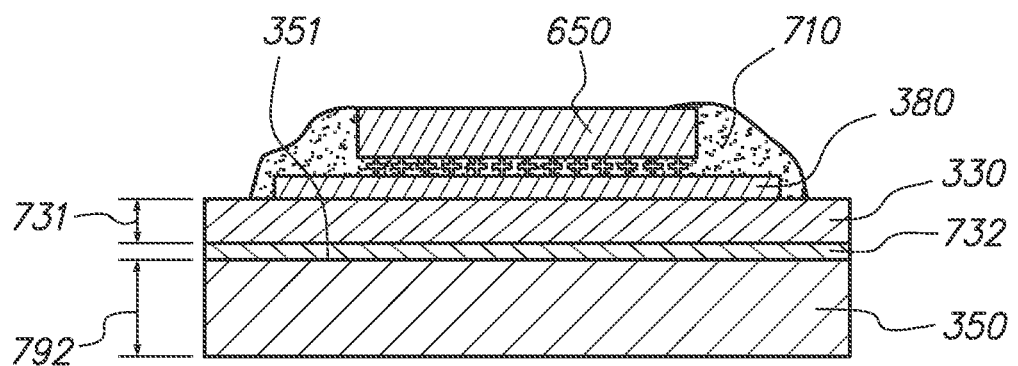
FIG. 7 depicts (in cross-sectional view) the bonding of a flexure bond pad to a corresponding FPC bond pad, by an anisotropic conductive film.

FIG. 7 depicts (in cross-sectional view) the ACF bonding of a flexure bond pad 650 to a corresponding FPC bond pad 380. In the cross-section of FIG. 7, the FPC dielectric layer 330 is adhered to the FPC stiffener layer 350 by a thin adhesive 732. FPC stiffener layer 350 includes a FPC stiffener layer surface 351 that underlies and faces the FPC bond pad 380. The FPC dielectric layer 330 has a dielectric layer thickness 731 and underlies the FPC bond pad 380. In certain embodiments, the FPC stiffener layer 350 may comprise aluminum having a FPC stiffener layer thickness 792 in the range of 50 to 200 microns. In certain embodiments the FPC stiffener layer 350 may comprise another material, for example stainless steel having a FPC stiffener layer thickness in the range of 15 to 100 microns.

In certain embodiments, the FPC bond pad 380 may be defined in a FPC conductive layer comprising copper having a FPC conductive layer thickness in the range of 5 to 25 microns. In certain embodiments, the FPC conductive layer may include a gold coating at the location of the FPC bond pads. The dielectric layer thickness 731 may be optimized to be thick enough for electrical performance while thin enough for adequate compliance of a flex cable loop (that facilitates actuation of the HSA) in the disk drive. In certain embodiments, the FPC dielectric layer 330 comprises polyimide and the dielectric layer thickness 731 is preferably but not necessarily in the range of 10 to 50 microns.

In FIG. 7, the flexure bond pad 650 is bonded to the FPC bond pad 380 by an ACF bonding material 710. The resulting electrical connection between the flexure bond pad 650 and the FPC bond pad 380 is depicted as a series of plus "+" shaped symbols in FIG. 7. The ACF material 710 may comprise an adhesive material that includes a plurality of electrically conductive beads of substantially similar diameter. In certain embodiments, the ACF material may employ beads of non-spherical shape, such as cylindrical beads or needle shaped beads.

In certain embodiments the ACF material 710 may be positioned or deposited on the FPC bond pad 380 prior to aligning the flexure bond pad 650 therewith. Alternatively, the ACF material 710 may be deposited on the flexure bond pad 650 (e.g. its surface facing the FPC bond pad 380). The ACF material 710 may be positioned or deposited between the flexure bond pad 650 and the FPC bond pad 380 prior to bringing a thermode tool into contact with an opposing side of the laminated flexure. A thermode tool may then press the flexure bond pad 650 against the FPC bond pad 380 during the period of bonding. Such pressure may arrange the plurality of electrically conductive beads in a monolayer. Each of the plurality of electrically conductive beads in the monolayer may be in electrical contact with both the flexure bond pad 650 and the corresponding FPC bond pad 380 (represented in FIG. 7 by the plus "+" shaped symbols). The thermode tool may also transfer heat and thereby raise the temperature of the ACF material during such period, for example to accelerate curing of its adhesive material.

In certain embodiments, the force of the thermode tool is sufficient to cause the electrically conductive beads to be substantially elastically deformed in compression between the flexure bond pad 650 and the corresponding FPC bond pad 380 during the period of thermal curing of the ACF material 710. After the thermode tool is removed, the electrically conductive beads cool (with the cured adhesive) from an elevated curing temperature. Such cooling causes the electrically conductive beads to shrink relative to their expanded size during thermal curing of the adhesive material.

However, the force applied by the thermode tool is preferably chosen to be great enough that the post-curing shrinkage of the electrically conductive beads cannot completely relieve the compressive deformation of the electrically conductive beads that was experienced during curing. Hence, after curing of the ACF material, and after removal of the thermode tool, the electrically conductive beads preferably remains in compression (and somewhat compressively deformed) between the flexure bond pad 650 and the corresponding FPC bond pad 380.

Although residual compression of the electrically conductive beads may correspond to some residual tension in the cured ACF material 710, such residual compression of the electrically conductive beads may be desirable to enhance and ensure reliable electrical conductivity of the ACF bond. For example, in the case where the electrically conductive beads are spherical, the residual compression may cause small flat spots where the electrically conductive beads contact the flexure bond pad 650 and the corresponding FPC bond pad 380. Such flat spots can provide finite contact areas rather than point contacts, which may desirably reduce the electrical resistance of the ACF bond.

Figure 8:
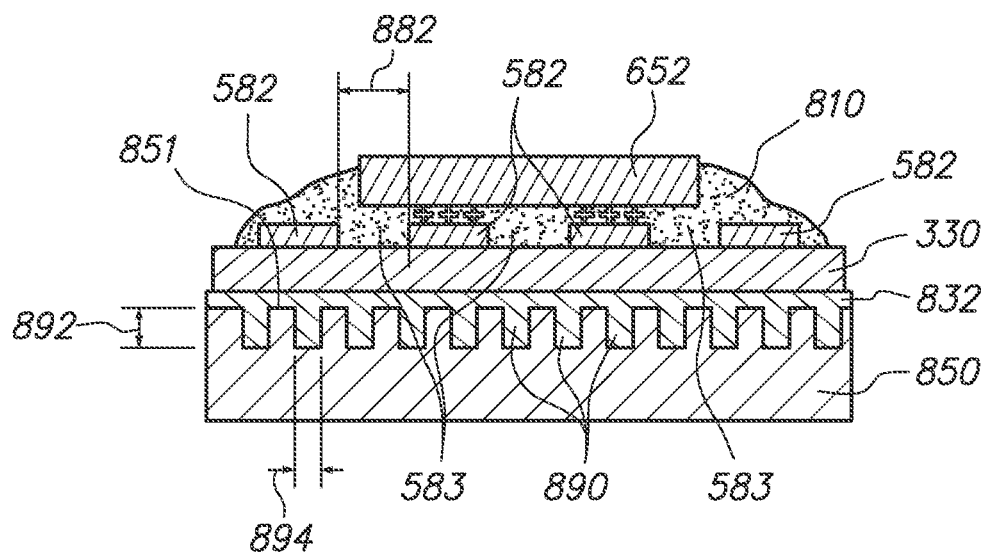
FIG. 8 depicts (in cross-sectional view) the bonding of a flexure bond pad to a corresponding FPC bond pad according to an embodiment of the present invention.

FIG. 8 depicts (in cross-sectional view) the bonding of a flexure bond pad 652 to a corresponding FPC bond pad 582 according to an embodiment of the present invention. The FPC bond pad 582 pertains to a FPC conductive layer that also includes a plurality of FPC traces (e.g. FPC traces 370 shown in FIG. 3), the FPC bond pad 582 being the electrically conductive terminus of one of the electrically conductive FPC traces. In FIG. 8, the flexure bond pad 652 is bonded to the FPC bond pad 582 by an ACF bonding material 810. The resulting electrical connection between the flexure bond pad 652 and the FPC bond pad 582 is depicted as a series of plus "+" shaped symbols in FIG. 8.

The FPC bond pad 582 is depicted as four distinct rectangles in the cross-sectional view of FIG. 8, because the FPC bond pad 582 is optionally internally patterned to define a FPC bond pad mesh with a plurality of openings 583 therethrough. In certain embodiments, the plurality of openings 583 through the FPC bond pad mesh may define an average internal mesh spacing 882 in the range 15 to 100 microns.

In the embodiment of FIG. 8, a metallic FPC stiffener layer 850 has a FPC stiffener layer surface 851 that underlies and faces the FPC bond pad 582. A FPC dielectric layer 330 may be disposed between the FPC bond pad 582 of the FPC conductive layer and the metallic FPC stiffener layer 850. In the embodiment of FIG. 8, the FPC dielectric layer 330 may be adhered to the FPC stiffener layer 850 by an electrically insulative adhesive 832. In the embodiment of FIG. 8, the FPC stiffener layer surface 851 may include a plurality of recessions 890. In certain embodiments, the plurality of recessions 890 may have a combined area that is between 25% and 75% of a total area of the FPC stiffener layer 850 that underlies the FPC bond pad 582. In certain embodiments, each of the plurality of recessions 890 in the FPC stiffener layer surface 851 defines a recession width 894 that preferably may be in the range 20 to 100 microns.

In the embodiment of FIG. 8, the plurality of recessions 890 in the FPC stiffener layer surface 851 may function as a means for reducing the electrical capacitance between the FPC bond pad 582 and the metallic FPC stiffener layer 850, by increasing an average distance between the FPC bond pad 582 and the underlying metallic FPC stiffener layer 850. For example, in the embodiment of FIG. 8 the plurality of recessions 890 in the FPC stiffener layer surface 851 may preferably have a depth 892 of at least 25 microns.

In the embodiment of FIG. 8, the foregoing dimensional inequalities and ranges may desirably and practically reduce the electrical capacitance between the FPC bond pad 582 and the metallic FPC stiffener layer 850. In certain embodiments, such reduction may desirably decrease an electrical impedance discontinuity at the FPC bond pad 582, which may desirably increase signal bandwidth and data transfer rate.

The invention is described herein with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A head stack assembly (HSA) for a disk drive, the HSA comprising:
    an actuator body, at least one actuator arm extending from the actuator body, and a flexible printed circuit (FPC), the FPC including
        a FPC conductive layer, the FPC conductive layer including a plurality of FPC traces defined therein, each of the plurality of FPC traces being electrically conductive and having a distal portion that terminates at a respective one of a plurality of FPC bond pads that are electrically conductive;
        a metallic FPC stiffener layer having a FPC stiffener layer surface that underlies and faces the FPC bond pads, the FPC stiffener layer surface including a plurality of recessions having a depth of at least 25 microns; and
        a FPC dielectric layer disposed between the FPC conductive layer and the metallic FPC stiffener layer;
        wherein at least one of the plurality of FPC bond pads is internally patterned to define a FPC bond pad mesh with a plurality of openings therethrough; and
    at least one head gimbal assembly comprising
        a read head; and
        a suspension assembly attached to the at least one actuator arm, the suspension assembly comprising
            a load beam, and
            a laminate flexure that includes a plurality of electrically conductive flexure traces that each terminate at a respective one of a plurality of electrically conductive flexure bond pads, the plurality of electrically conductive flexure bond pads being bonded to the plurality of FPC bond pads.

2. The HSA of claim 1 wherein the FPC conductive layer and the plurality of FPC bond pads comprise copper and define a FPC conductive layer thickness in the range of 5 to 25 microns.

3. The HSA of claim 1 wherein the metallic FPC stiffener layer comprises aluminum having a FPC stiffener layer thickness in the range of 50 to 200 microns.

4. The HSA of claim 1 wherein the plurality of electrically conductive flexure bond pads is bonded to the plurality of FPC bond pads by an anisotropic conductive film.

5. The HSA of claim 1 wherein each of the plurality of recessions in the FPC stiffener layer surface defines a recession width in the range 20 to 100 microns.

6. The HSA of claim 1 wherein a combined area of the plurality of recessions in the FPC stiffener layer surface comprises between 25% and 75% of a total area of the FPC stiffener layer that underlies the FPC bond pads.

7. The HSA of claim 1 wherein the FPC dielectric layer comprises polyimide having a dielectric layer thickness in the range 10 to 50 microns.

8. The HSA of claim 1 wherein the plurality of openings through the FPC bond pad mesh defines an internal mesh spacing in the range 15 to 100 microns.

9. The HSA of claim 1 wherein a combined area of the plurality of openings through the FPC bond pad mesh comprises between 25% and 75% of a total area of the at least one of the plurality of FPC bond pads that is internally patterned to define the FPC bond pad mesh.

10. A head stack assembly (HSA) for a disk drive, the HSA comprising:
    an actuator body, at least one actuator arm extending from the actuator body, and a flexible printed circuit (FPC), the FPC including
        a FPC conductive layer, the FPC conductive layer including a plurality of FPC traces defined therein, each of the plurality of FPC traces being electrically conductive and having a distal portion that terminates at a respective one of a plurality of FPC bond pads that are electrically conductive;
        a metallic FPC stiffener layer having a FPC stiffener layer surface that underlies and faces the FPC bond pads, the FPC stiffener layer surface including a plurality of recessions having a depth of at least 25 microns; and
        a FPC dielectric layer disposed between the FPC conductive layer and the metallic FPC stiffener layer; and
    at least one head gimbal assembly comprising
        a read head; and
        a suspension assembly attached to the at least one actuator arm, the suspension assembly comprising
            a load beam, and
            a laminate flexure that includes a plurality of electrically conductive flexure traces that each terminate at a respective one of a plurality of electrically conductive flexure bond pads, the plurality of electrically conductive flexure bond pads being bonded to the plurality of FPC bond pads.

11. The HSA of claim 10 wherein the metallic FPC stiffener layer comprises aluminum having a FPC stiffener layer thickness in the range of 50 to 200 microns.

12. The HSA of claim 10 wherein each of the plurality of recessions in the FPC stiffener layer surface defines a recession width in the range 20 to 100 microns.

13. The HSA of claim 10 wherein a combined area of the plurality of recessions in the FPC stiffener layer surface comprises between 25% and 75% of a total area of the FPC stiffener layer that underlies the FPC bond pads.

14. A head stack assembly (HSA) for a disk drive, the HSA comprising:
    an actuator body, at least one actuator arm extending from the actuator body, and a flexible printed circuit (FPC), the FPC including
        a FPC conductive layer, the FPC conductive layer including a plurality of FPC traces defined therein, each of the plurality of FPC traces being electrically conductive and having a distal portion that terminates at a respective one of a plurality of FPC bond pads that are electrically conductive;
        a metallic FPC stiffener layer that underlies the FPC bond pads; and
        a FPC dielectric layer disposed between the FPC conductive layer and the metallic FPC stiffener layer;

wherein at least one of the plurality of FPC bond pads is internally patterned to define a FPC bond pad mesh with a plurality of openings therethrough; and at least one head gimbal assembly comprising
a read head; and
a suspension assembly attached to the at least one actuator arm, the suspension assembly comprising
a load beam, and
a laminate flexure that includes a plurality of electrically conductive flexure traces that each terminate at a respective one of a plurality of electrically conductive flexure bond pads, the plurality of electrically conductive flexure bond pads being bonded to the plurality of FPC bond pads.

15. The HSA of claim 14 wherein the FPC conductive layer and the plurality of FPC bond pads comprise copper and define a FPC conductive layer thickness in the range of 5 to 25 microns.

16. The HSA of claim 14 wherein each of the plurality of openings through the FPC bond pad mesh defines an internal mesh spacing in the range 15 to 100 microns.

17. The HSA of claim 14 wherein a combined area of the plurality of openings through the FPC bond pad mesh comprises between 25% and 75% of a total area of the at least one of the plurality of FPC bond pads that is internally patterned to define the FPC bond pad mesh.

18. A head stack assembly (HSA) for a disk drive, the HSA comprising:
an actuator body, at least one actuator arm extending from the actuator body, and a flexible printed circuit (FPC), the FPC including
a FPC conductive layer, the FPC conductive layer including a plurality of FPC traces defined therein, each of the plurality of FPC traces being electrically conductive and having a distal portion that terminates at a respective one of a plurality of FPC bond pads that are electrically conductive;
a metallic FPC stiffener layer that underlies the FPC bond pads; and
a FPC dielectric layer disposed between the FPC conductive layer and the metallic FPC stiffener layer;
wherein the FPC includes a means for reducing the electrical capacitance between the FPC bond pads and the metallic FPC stiffener layer; and at least one head gimbal assembly comprising
a read head; and
a suspension assembly attached to the at least one actuator arm, the suspension assembly comprising
a load beam, and
a laminate flexure that includes a plurality of electrically conductive flexure traces that each terminate at a respective one of a plurality of electrically conductive flexure bond pads, the plurality of electrically conductive flexure bond pads being bonded to the plurality of FPC bond pads.

19. The HSA of claim 18 wherein the means for reducing the electrical capacitance between the FPC bond pads and the metallic FPC stiffener layer is a means for reducing an effective total surface area of the FPC bond pads.

20. The HSA of claim 18 wherein the means for reducing the electrical capacitance between the FPC bond pads and the metallic FPC stiffener layer is a means for increasing an average distance between the FPC bond pads and the underlying metallic FPC stiffener layer.

* * * * *